US012183176B2

(12) United States Patent
McMaster et al.

(10) Patent No.: US 12,183,176 B2
(45) Date of Patent: Dec. 31, 2024

(54) MOBILE DEVICE DETECTION (71) Applicant: Comcast Cable Communications, LLC, Philadelphia, PA (US)

(72) Inventors: William McMaster, Las Vegas, NV (US); James Kosta, Sunnyvale, CA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 17/724,828

(22) Filed: Apr. 20, 2022

(65) Prior Publication Data
US 2022/0246007 A1    Aug. 4, 2022

Related U.S. Application Data (63) Continuation of application No. 16/602,692, filed on Nov. 21, 2019, now Pat. No. 11,443,603.

(51) Int. Cl.
*G08B 1/08* (2006.01)
*G08B 7/06* (2006.01)
*G08B 13/196* (2006.01)
*G08B 15/00* (2006.01)
*G08B 25/00* (2006.01)
*H04W 8/00* (2009.01)
*H04W 48/02* (2009.01)

(52) U.S. Cl.
CPC ............. *G08B 15/004* (2013.01); *G08B 7/06* (2013.01); *G08B 13/19669* (2013.01); *G08B 13/19697* (2013.01); *G08B 25/009* (2013.01); *H04W 8/005* (2013.01); *H04W 48/02* (2013.01)

(58) Field of Classification Search
CPC .. G08B 15/004; G08B 7/06; G08B 13/19669; G08B 13/19697; G08B 25/009; G08B 13/00; G08B 13/1672; G08B 13/19602; G08B 15/00; H04W 8/005; H04W 48/02; H04W 24/02
USPC ...................................................... 340/539.1
See application file for complete search history.

(56) References Cited

U.S. PATENT DOCUMENTS

| | | | |
|---|---|---|---|
| 5,220,680 A | 6/1993 | Lee | |
| 9,118,710 B2* | 8/2015 | Oliphant | ............. H04L 63/1433 |
| 9,215,585 B2 | 12/2015 | Pridmore et al. | |
| 10,594,987 B1 | 3/2020 | Nixon et al. | |
| 10,621,839 B2 | 4/2020 | Vazirani | |

(Continued)

OTHER PUBLICATIONS

U.S. Pat. No. 10,621,839, Next Generation Monitoring System, Apr. 14, 2020.

(Continued)

*Primary Examiner* — Tai T Nguyen
(74) *Attorney, Agent, or Firm* — Banner & Witcoff, Ltd.

(57) ABSTRACT

Systems, apparatuses, and methods are described for the detection, following a trigger event, of a device that may be sending and/or receiving signals within a space associated with a wireless network. A wireless signal receiver may be activated and may identify the device by detecting transmissions from the device, such as WiFi, Bluetooth, cellular or other wireless transmissions. The wireless signal receiver may extract, without connecting the device to a local network, information from the transmission that may identify the device. The wireless signal receiver may send the information to an alarm monitor and may be placed in a dormant state.

30 Claims, 6 Drawing Sheets

(56) References Cited

U.S. PATENT DOCUMENTS

| | | |
|---|---|---|
| 2009/0119754 A1 | 5/2009 | Schubert |
| 2010/0100945 A1 | 4/2010 | Ozzie et al. |
| 2012/0280783 A1 | 11/2012 | Gerhardt et al. |
| 2013/0300564 A1* | 11/2013 | Lamb .................. G08B 25/008 340/573.4 |
| 2014/0018059 A1 | 1/2014 | Noonan |
| 2015/0061859 A1* | 3/2015 | Matsuoka ............ G08B 25/008 340/501 |
| 2015/0121529 A1* | 4/2015 | Quinlan .............. H04W 12/121 726/23 |
| 2015/0130614 A1 | 5/2015 | Liu |
| 2016/0049064 A1 | 2/2016 | McNabb et al. |
| 2016/0189510 A1* | 6/2016 | Hutz .................. H04L 12/6418 340/541 |
| 2017/0180921 A1 | 6/2017 | Pelochino et al. |
| 2018/0137730 A1 | 5/2018 | White |
| 2019/0035242 A1 | 1/2019 | Vazirani |
| 2019/0266819 A1* | 8/2019 | McHale ............. G05D 23/1917 |
| 2019/0285748 A1 | 9/2019 | DeVries et al. |
| 2019/0318611 A1 | 10/2019 | Gravel et al. |

OTHER PUBLICATIONS

U.S. Pat. No. 11,386,760, Next Generation Monitoring System, Jul. 12, 2022.
U.S. Appl. No. 16/602,692, Mobile Device Detection, filed Nov. 21, 2019.
U.S. Appl. No. 17/743,970, Next Generation Monitoring System, filed May 13, 2022.

* cited by examiner

MOBILE DEVICE DETECTION

CROSS-REFERENCE TO RELATED APPLICATIONS

This application is a continuation of and claims priority to U.S. application Ser. No. 16/602,692, filed Nov. 21, 2019 (now U.S. Pat. No. 11,443,603), the disclosure of which is herein incorporated by reference in its entirety.

BACKGROUND

Monitoring systems, such as video surveillance systems, associated with a home or business security system may be able to detect and provide information regarding actions that take place within their field of view. In the event of a home or business invasion, these monitoring systems may be able to capture images or audio of the intruder, but may not be able to capture other information to assist in determining the intruder's identity. Additionally, monitoring systems may have limited fields of view or may be manipulated by the intruder to prevent capturing of images or audio of the intruder.

SUMMARY

The following summary presents a simplified summary of certain features. The summary is not an extensive overview and is not intended to identify key or critical elements.

Detection of mobile devices and/or other user devices, based on an indication of an event, such as the triggering of an alarm and/or other indication of an entry into or other activity associated with a premises, is described. If the alarm is triggered, a wireless signal receiver may become active and listen for wireless signals of mobile devices within range of the signal receiver. The signal receiver may process the wireless signals to determine information regarding the mobile device that sent the signal, including, for example, the IMEI number of the mobile device. The signal receiver may determine the information without establishing a connection with the mobile device. As a matter of privacy, a detection of all devices in proximity to a premises at all times may not be desired. However, in cases such as, for example, where an intruder has gained unauthorized entry or vandalism has occurred, detection of mobile devices in the area may assist law enforcement investigating such events.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

The accompanying drawings, which form a part hereof, show examples of the disclosure. It is to be understood that the examples shown in the drawings and/or discussed herein are non-exclusive and that there are other examples of how the disclosure may be practiced.

Figure 1:
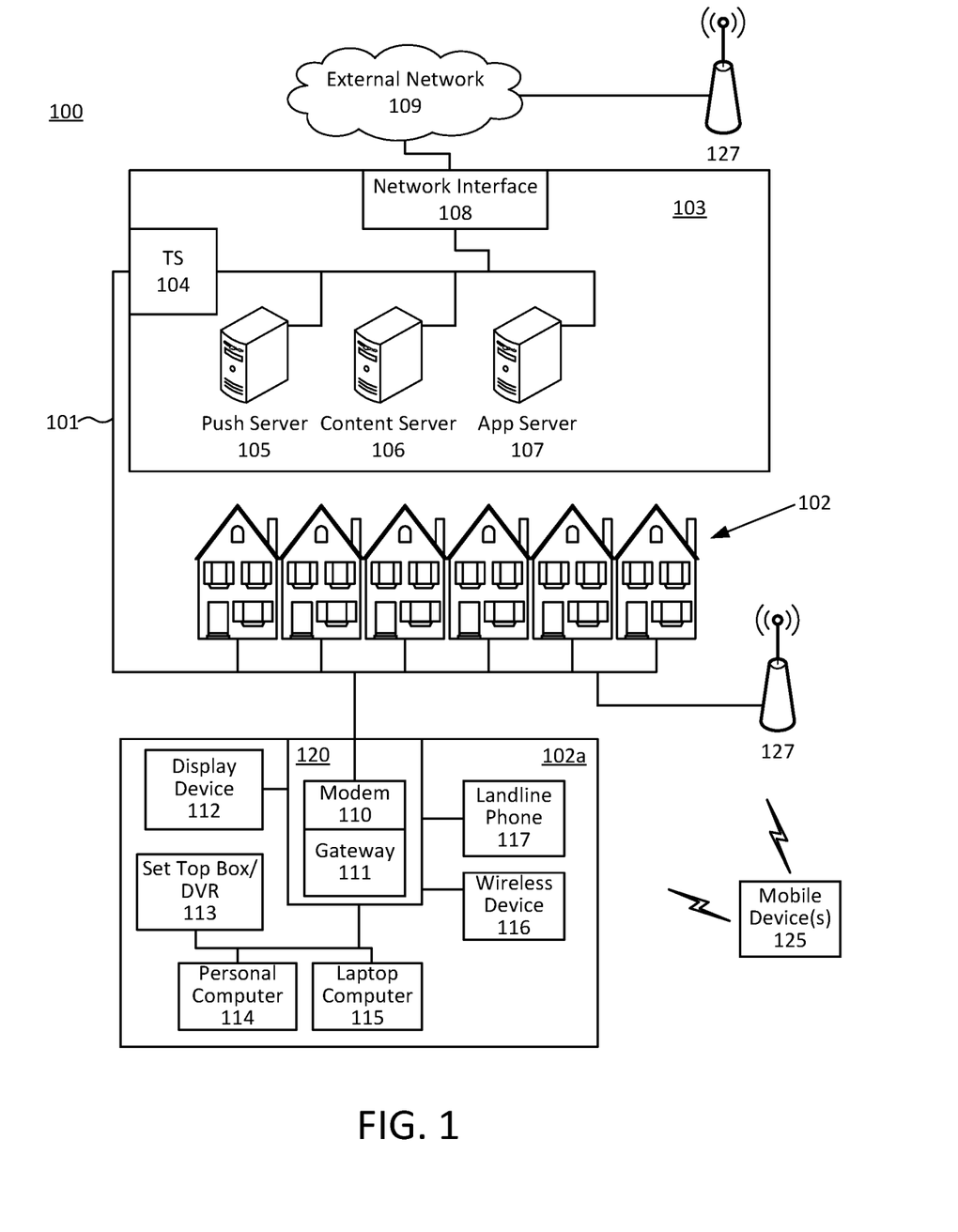
FIG. 1 shows an example communication network.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and back-end devices such as servers 105-107, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. Although shown separately, the push server 105, the content server 106, the application server 107, and/or other server(s) may be combined. The servers 105, 106, and 107, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA)), landline phones 117 (e.g. Voice over Internet Protocol VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
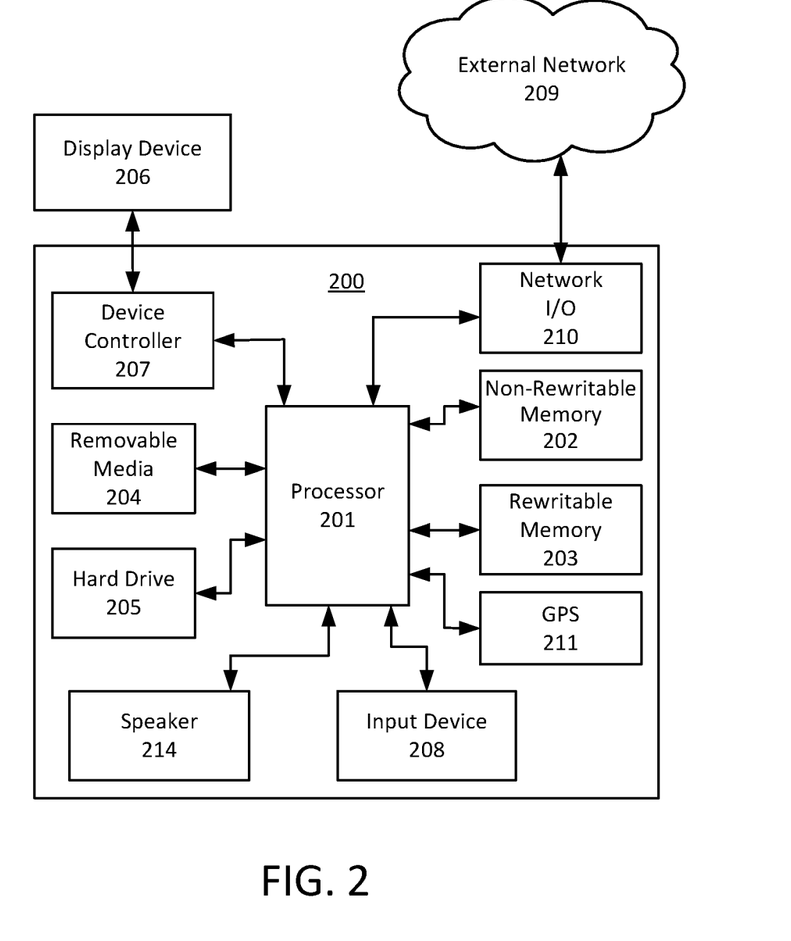
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., the wireless signal receiver and/or any other devices described in connection with FIG. 3 below). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
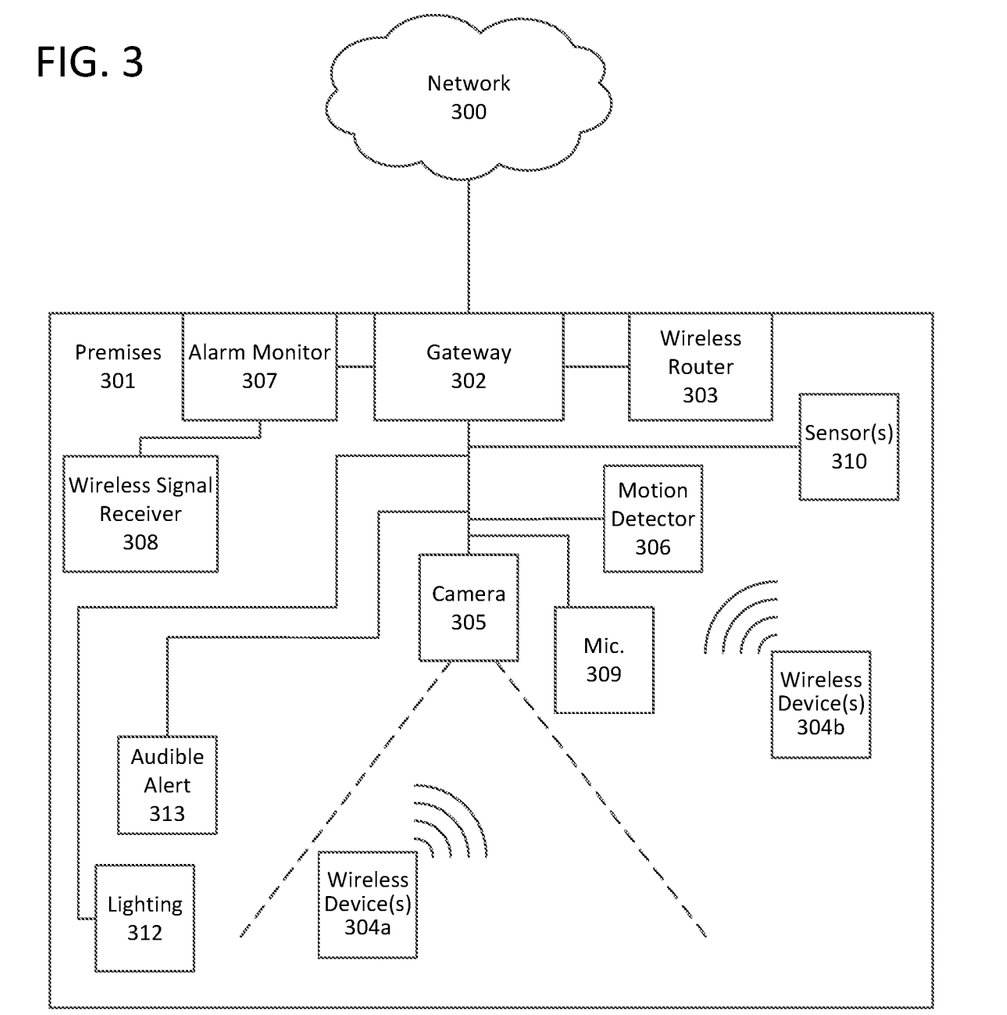
FIG. 3 shows an example of a system for detecting a wireless device following a trigger event.

FIG. 3 shows an example of a system for detecting one or more wireless signals (e.g., wireless communications) from one or more wireless devices. One or more elements in FIG. 3 may comprise elements from FIG. 1. A network 300 may, for example, comprise the communication links 101 and/or the external network 109 and/or other networks. A premises 301 may comprise a premises such as the premises 102a.

The gateway 302 may comprise, for example, a computing device such as the interface 120 of FIG. 1. A wireless router 303 may be, for example, configured to provide wireless communication channels to communicate with one or more wireless device(s), such as wireless device(s) 304a-b, which may be on- or off-premises. The wireless router 303 is shown located separately from the gateway 302 but may also, or alternatively, be located inside the gateway 302. The premises 301 may include one or more devices and/or sensors, such as a camera 305, a microphone 309, a motion detector 306, a network-enabled device, a premises device, a premises management device, an entertainment system device, a home automation device, a home security device, an Internet of Things (IoT) device, a controllable device, a security system device, and/or other sensor(s) 310. A sensor 310 may comprise, for example, a sensor that detects opening of a door, window, vent, or other premises passageway, a heat sensor (e.g., an infrared (IR) sensor), a pressure sensor, a water sensor, a chemical sensor, a contact sensor, an electrical field sensor, a magnetic sensor, a sensor to detect opening or closing of a cabinet or other enclosure, a sensor to detect activation of interior lighting and/or of other devices, a sensor to detect a change in electrical power consumption, and/or any other type of device configured to detect a change in a physical condition or state. The premises 301 may comprise one or more lighting devices 312 (e.g., flood lights, entry lights, table lamps, ceiling lamps) and/or one or more audible alert devices 313 (e.g., a siren, a loudspeaker, an alarm bell, a buzzer, and/or any other device configured to output sound). The gateway 302 may communicate with the camera 305, the microphone 309, the motion detector 306, the sensor(s) 310, the lighting device(s) 312, the audible alert device(s) 313, the wireless router 303, and/or other devices via, e.g., a local network within the premises 301. Although shown separately, the camera 305, the microphone 309, and/or the motion detector 306, and/or any of the other devices shown in the premises 301, may also, or alternatively, be combined. Various elements depicted in FIG. 3 may be implemented or grouped together in any way desired.

Additionally, although one camera, one microphone, and one motion detector are shown in FIG. 3, a premises 301 may include any number of motion detection devices, sensors, microphones, sensors, cameras, and/or other devices. Cameras may comprise any type of image capture and/or recording devices such as video cameras, still cameras, computing devices, user devices, and/or other device configured to capture and/or record video and/or video images. User devices may comprise computing devices such as personal computers, desktop computing devices, laptop computing devices, tablet computing devices, palmtop computing devices, cellular telephones (e.g., smartphones and feature phones), network-enabled televisions (e.g., "smart" televisions), network-enabled video game machines, STBs, DVRs, network-enabled audio devices, network-enabled data storage devices, network enabled home appliances, and other types of computing devices having a network interface suitable for exchanging communications via a local network, the network 300, and/or other networks.

The camera 305 may be configured to continuously record video of the surrounding area, such as a video camera for a surveillance or security system. Alternatively, the camera 305 may be configured to record video on demand and/or after a trigger event, such as after detecting movement. The camera 305 may have a field of view that is 360 degrees or less than 360 degrees. The camera 305 and the motion detector 306 may be configured to send signals such as video feeds and motion detection information to the alarm monitor 307 via the gateway 302. The camera 305, the gateway 302, the alarm monitor 307, and/or another computing device may execute software that detects movement in a series of images from the camera. The microphone 309 may be configured to detect sound levels within the premises 301. The microphone 309, the gateway 302, the alarm monitor 307, and/or another computing device may execute software that determines, based on intensity, pitch, and/or other characteristics of sound detected by the microphone 309, whether an intruder has entered the premises and/or whether other types of events (e.g., a dog barking, a crashing sound of glass or other material breaking) have occurred.

The premises 301 may also include an alarm monitor 307 and a wireless signal receiver 308. The alarm monitor 307 may comprise, for example, a premises management system that performs one or more operations (e.g., lighting control, HVAC control, media device control, ordering products for delivery to the premises 301, etc.) in addition to the operations described herein. The alarm monitor 307 and the wireless signal receiver 308 may be, for example, computing devices such as the computing device 200 of FIG. 2 and may be configured to communicate with the gateway 302 via the local network. The alarm monitor 307 and the wireless signal receiver 308 are shown as single elements in the example of FIG. 3. In other examples, the alarm monitor 307 and/or the wireless signal receiver 308 may be co-located. The alarm monitor 307 and the wireless signal receiver 308 may also be located (together or separately) inside the gateway 302, the camera 305, the motion detector 306, another local computing device and/or any combination thereof. Additionally, or alternatively, the functionality of the alarm monitor 307 and/or the wireless signal receiver 308 may be implemented across two or more computing devices. Also, while the alarm monitor 307 in the example of FIG. 3 may be located at the premises 301, the alarm monitor 307 may also, or alternatively, be located remotely, in which case, the alarm monitor 307 may be in communication with the premises 301 via the network 300.

The alarm monitor 307 may be configured to send and/or receive signals from sensors and/or devices in and around the premises 301, including, for example, video feeds from the camera 305, audio feeds from the microphone 309, information from the motion detector 306, and/or information from any other sensor(s) 310. The alarm monitor 307 may be configured to determine a trigger event has occurred upon receipt of the video feed, audio feed, motion detector information (e.g., if the motion detector 306 detects motion in the premises 301), and/or sensor information (e.g., if any of the sensor(s) 310 and/or other device(s) is tripped by detection of a condition or change that the sensor/device is configured to detect). A trigger event may comprise an opening of a door, window, or other passage, which opening may be detected by a door, window, or other sensor. A trigger event may comprise an activation of a panic alarm (e.g., a user pressing an alarm button). A trigger event may comprise a presence of one or more persons in the premises 301, which presence may be indicated by signals from one or more of the motion sensor 306, a heat sensor, a vibration sensor, a contact sensor, and/or any other type of sensor. A trigger event may comprise a break-in, intrusion, or other event indicated by noise detected by the microphone 309 and/or movement detected by the camera 305. A trigger event may comprise an intrusion or other abnormal condition indicated by increased power usage (detected, e.g., by a power usage sensor), by activation of interior lighting (detected, e.g., by a lighting sensor and/or by images from the camera 305), by activation of appliances or other devices (detected, e.g., by a power usage sensor and or by sensors configured to indicate statuses of specific devices), by opening of a cabinet, closet, and/or other storage area (detected, e.g., by sensors configure to detect movement of cabinet doors, closet doors, and/or other components), and/or by other activity and/or condition. The foregoing are non-limiting examples, and a trigger event may comprise any other condition or action that may be detectable at or near the premises 301 by any type of sensor or device. The alarm monitor 307 may also be configured to process the images in the video feeds, audio from the audio feeds, and/or other sensor information (which may be sent to the alarm monitor 307 continuously) and to determine whether a trigger event has occurred at the premises 301. The alarm monitor 307 may also be configured to be programmed by a user to prompt a trigger event at a predetermined time, either manually as a one-time event or by setting events to occur automatically over a period of time.

The alarm monitor 307 may be configured to activate, based on a trigger event being detected, the wireless signal receiver 308. Prior to activation, the wireless signal receiver 308 may be in a dormant state. In the dormant state, for example, the wireless signal receiver may cease (or otherwise not be) scanning for wireless signals and/or may cease (or otherwise not be) logging and/or otherwise processing signals that are received. The wireless signal receiver 308 may be configured to emulate a cellular tower or base station, upon activation, by forming a picocell, femtocell, or similar small area cellular network, a Wi-Fi access point, a Bluetooth transceiver, and/or other type of access point.

The wireless signal receiver 308 may be configured to scan for and detect wireless signals (e.g., wireless communications such as cellular signals, WiFi probe requests, Bluetooth signals, and/or other wireless communications) sent from wireless device(s) 304*a-b* that are within range of the wireless signal receiver 308. The wireless signal receiver 308 may have a cellular antenna, WiFi receiver, WiFi antenna, Bluetooth transceiver and/or any other type of device that may listen for and/or receive the wireless signals. The wireless signals need not be directed to the wireless signal receiver 308. The wireless signal receiver 308 may be configured to detect beacon announcements and/or other signals that the wireless device(s) 304*a-b* might transmit without establishing a connection with the wireless device(s) 304*a-b* or relaying the signals from the wireless device(s) 304*a-b*. The wireless device(s) 304*a-b* may be any type of device that is configured to emit wireless signals, such as computing devices, user devices, smart watches, fitness trackers, and/or other devices that emit such wireless signals.

The range of the wireless signal receiver 308 may be in accordance with the applicable wireless protocols for the type of wireless signal receiver employed at the premises (e.g., CDMA, Wi-Fi and/or Bluetooth protocols). The premises 301 may include barriers that may affect the range of the wireless signal receiver 308. Additionally, directional antennas or other devices (not shown) may be used to adjust the range of the wireless signal receiver 308 and/or focus the wireless signal receiver 308 to a particular area of the premises 301. Limiting or altering the range and/or direction of the wireless signal receiver 308 may be useful in high density population areas to avoid unnecessary detection of wireless signals surrounding the premises 301 in the event of an alarm or trigger event.

The wireless signal receiver 308 may be configured to, when emulating a small area cellular network, receive wireless signals, such as a signal from the wireless device(s) 304*a-b* that may be searching for a cell tower. In this example, the wireless device may be sending signals attempting to initiate a connection with the cellular network. The wireless device(s) 304*a-b*, when entering the range of the cellular network established by the wireless signal receiver 308, may automatically attempt to connect to the cellular network via a cellular wireless protocol. The wireless device(s) 304*a-b* may send a message which includes a unique identifier for the wireless device(s) 304*a-b*, such as an International Mobile Equipment Identity (IMEI) number, to the wireless signal receiver 308. The wireless signal receiver 308 may be configured to receive the message and determine the IMEI number or other identifier and may further be configured to determine a phone number associated with the wireless device(s) 304*a-b*. Rather than establishing a connection with the wireless device(s) 304*a-b*, the wireless signal receiver 308 may be configured to send a denial of service message and/or other wireless communication(s) to the wireless device(s) 304*a-b*.

If, for example, the wireless signal receiver 308 is emulating (or comprises) a Wi-Fi access point or Bluetooth transceiver, the wireless signal receiver 308 may be configured to listen and scan for wireless signals within range of the wireless signal receiver 308. The wireless signal receiver 308 may be configured to receive a probe request from the wireless device(s) 304*a-b*. The wireless signal receiver 308 may be configured to respond to the probe request by sending a wireless communication indicating the Service Set Identifier (SSID), Universally Unique Identifier (UUID), or other unique identifier associated with the wireless signal receiver 308. The wireless device(s) 304*a-b* may attempt to authenticate to the wireless signal receiver 308. The authentication request from the wireless device(s) 304*a-b* may include information such as the (Media Access Control) MAC address or other identifier associated with the wireless device(s) 304*a-b*. The wireless signal receiver 308 may be configured to receive the authentication request and determine the MAC address (or other identifier) of the wireless device(s) 304*a-b*. The wireless signal receiver 308 may be configured to send an authentication response indicating a failure to authenticate the wireless device(s) 304*a-b*. Alternatively, the wireless signal receiver 308 may be configured to not respond to the authentication request. In another example, the wireless signal receiver 308 may be configured to authenticate the wireless device(s) 304*a-b*, but not respond to an association or connection request from the wireless device(s) 304*a-b*.

Additionally, or alternatively, rather than wait for a probe request from the wireless device(s) 304*a*-*b*, the wireless signal receiver 308 may be configured to broadcast a beacon frame that may include the SSID, UUID, or other identifier associated with the wireless signal receiver 308 to prompt an authentication request from the wireless device(s) 304*a*-*b*.

The wireless signal receiver 308 may be configured to determine whether a predetermined period of time has expired since the wireless signal receiver 308 was activated. The wireless signal receiver 308 may be configured to continue to listen for wireless signals if the time period has not expired. The wireless signal receiver 308 may also be configured to send information regarding the failure to detect a wireless signal within the predetermined time period if the time period has expired.

The wireless signal receiver 308 may be configured to determine, if a wireless signal is detected, data from the wireless signal such as an IMEI number, a (Media Access Control) MAC address, an IP address, a Bluetooth ID, device ID and/or other device information. Because the wireless signals are sent using standard communication protocols, the wireless signal receiver 308 may retrieve the device information by checking known fields in the wireless signals depending on the applicable protocol.

The wireless signal receiver 308 may be configured to store the determined data locally such as in a log and/or cause storage within another computing device, such as, e.g., the alarm monitor 307, the gateway 302, another device associated with the premises 301 (e.g., another computing device located at the premises 301, a computing device linked to an account associated with the premises 301, etc.), and/or other storage device. Additionally, or alternatively, the wireless signal receiver 308 may be configured to send the determined data to the alarm monitor 307, which may be also configured to store the determined data locally and/or cause storage within another local computing device. The wireless signal receiver 308 and/or the alarm monitor 307 may also or alternatively be configured to send the determined data to a network storage device via the gateway 302 and network 300. The wireless signal receiver 308 and/or the alarm monitor 307 may further be configured to store other data regarding the detected signal(s) such as an association of the event and/or the determined one or more identifiers and/or other information relating to wireless devices associated with the determined one or more identifiers (e.g., device information looked up and/or otherwise derived based on a determined identifier). An association of the event, the one or more identifiers, and/or the one or more wireless devices may comprise, for example, data indicating the event. Data indicating the event may, for example, comprise data indicating a type of the event, data indicating a time of the event, data indicating a location of the event, data indicating sensor(s) that output signals indicating the event, video used to determine and/or captured as a result of the event, audio used to determine and/or captured as a result of the event, motion sensor data used to determine and/or captured as a result of the event, other data that was used to determine and/or captured as a result of the event, and/or other information related to the event. An association of the event, the one or more identifiers, and/or the one or more wireless devices may comprise, for example, data indicating the identifiers. An association of the event, the one or more identifiers, and/or the one or more wireless devices may comprise, for example, information based on or derived from the identifiers (e.g., device type and/or manufacturer determined from a MAC address, telephone number and/or device type determined from an IMEI, information about a user associated with a device (e.g., determined based on reverse lookup from phone number), etc.). The wireless signal receiver 308 and/or the alarm monitor 307 may be configured to store the data in a log and to provide the log in response to an inquiry, for example, the log may be provided in response to an inquiry from the police or other security or emergency professionals who may use the stored data to assist in finding information regarding the owner of the device. The data may also be periodically erased from storage, such as after a predetermined period of time has elapsed.

The wireless signal receiver 308 may be configured to return to a dormant state, for example, after storage of the wireless signal data. The alarm monitor 307 may be configured to instruct the wireless signal receiver 308 to deactivate the ability to listen for and/or receive wireless signals. The alarm monitor may be further configured to reactivate the wireless signal receiver 308, for example, after a predetermined period of time following the trigger event, to determine whether there is any change in the wireless signals that are detected.

Figure 4:
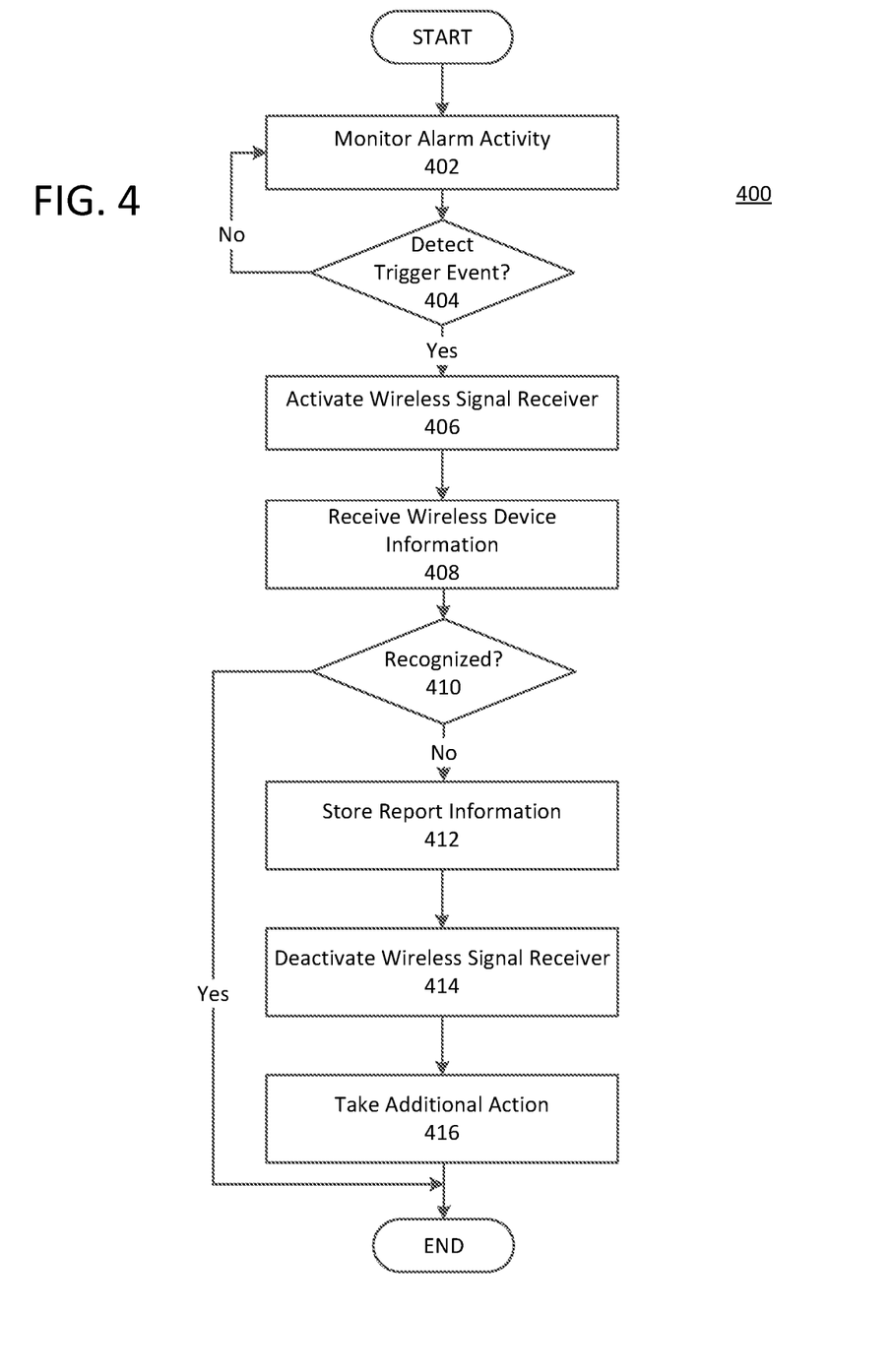
FIG. 4 is a flow chart showing an example method for recording wireless device data following a trigger event.
Figure 5:
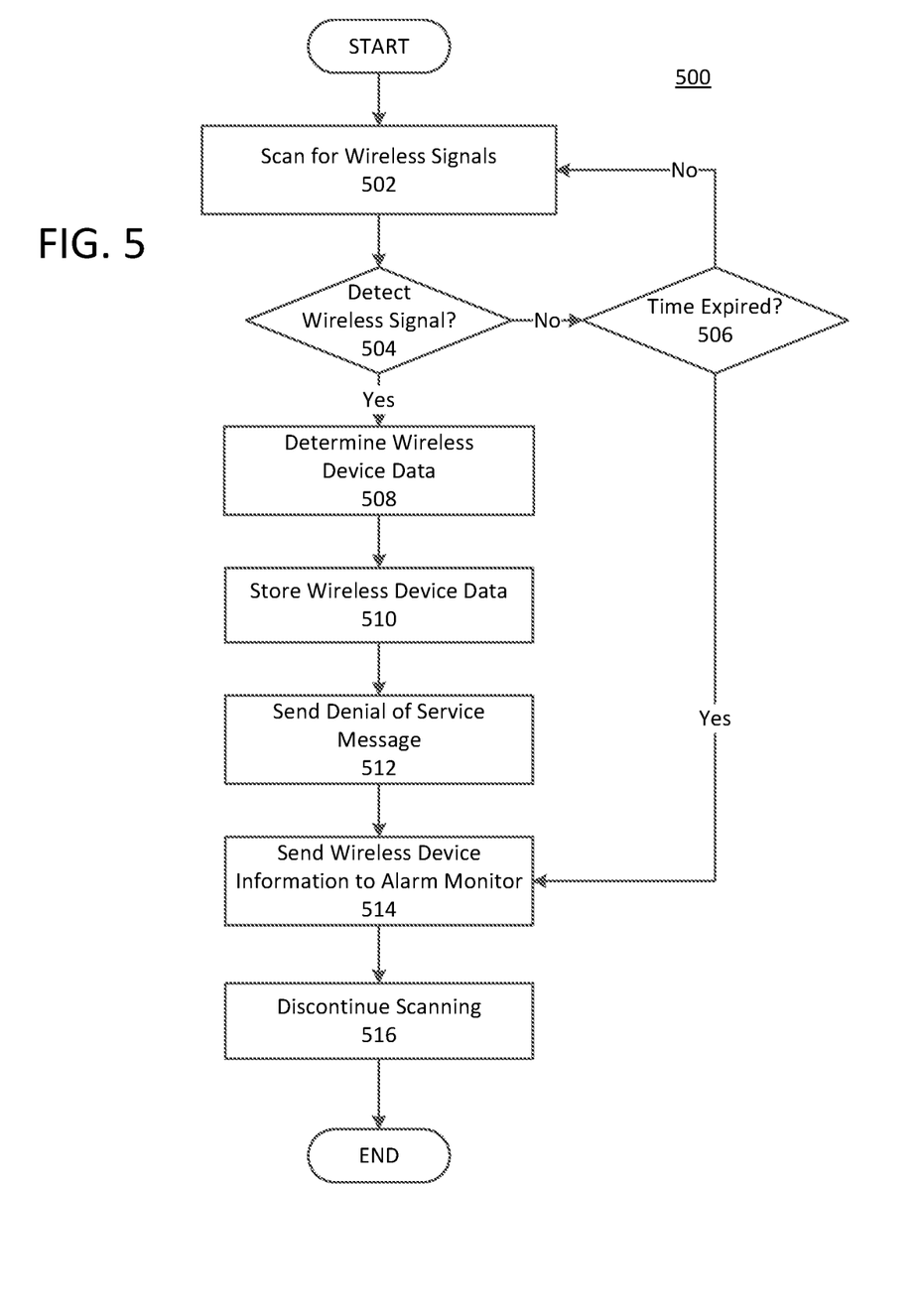
FIG. 5 is a flow chart showing another example method for detecting wireless device data following a trigger event.
Figure 6:
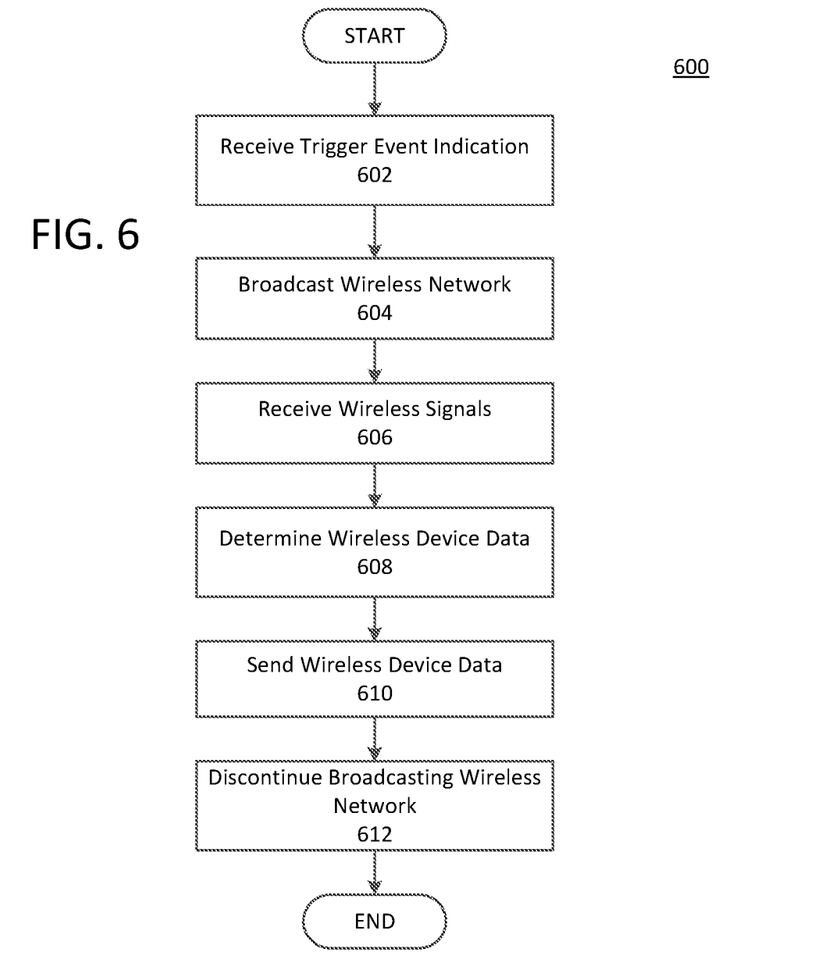
FIG. 6 is a flow chart showing another example method for detecting wireless device data following a trigger event.

FIGS. 4-6 are flow charts showing example methods performed by an alarm monitor (FIG. 4) and a wireless signal detection unit (FIGS. 5 and 6) in the system of FIG. 3. One, some, or all of the steps shown in FIGS. 4-6 could also, or alternatively, be performed by one or more other computing devices (e.g., other elements in the system of FIG. 3 and/or of one or more other networks). The methods shown in FIGS. 4-6 and/or one or more steps thereof may be performed based on execution, by one or more processors of one or more computing devices, of instructions that are stored in a computer-readable medium, such as a non-transitory computer-readable memory. The steps in these flow diagrams need not all be performed in the order described or shown, some steps may be omitted and/or otherwise changed, and/or steps may be added.

FIG. 4 is a flow chart showing an example method 400 performed by the alarm monitor 307 for recording wireless device data following a trigger event. In step 402, the alarm monitor 307 may monitor alarm activity by receiving information relating to a security system and/or other devices via a local network and analyzing the information to determine whether an event has occurred (e.g., whether a condition indicating a security concern exists). Such information may include video feeds from video surveillance cameras, sound from microphones, information from motion detectors and/or other sensors, and/or other security system or other information.

In step 404, the alarm monitor 307 may detect a trigger event. Non-limiting examples of trigger events are described above. A trigger event may comprise and/or be the result of detecting a security threat or other condition based on signals received from sensors and/or devices (e.g., such as those described above). Those signals may, for example, indicate activation, deactivation, tripping, interruption, detection, actuation, de-actuation, and/or any other activity, condition, state, and/or change by, of, or associated with a sensor or device (e.g., such as one of those described above). The threat and/or condition detected based on those signals may comprise any condition, state, and/or action in proximity to the premises 301 (e.g., intrusion and/or any other condition, state, and/or action described above). The signals received by the alarm monitor 307 may also or alternatively comprise signals received from a separate system in the premises 301 (e.g., from a separate premises management system), and/or an event detected by the alarm monitor 307 may be detected by such a separate system and communicated to the alarm monitor 307. A user may also manually schedule a trigger event to occur at certain predetermined times, such as when the user may be away from the premises. A user may also schedule a trigger event to automatically reoccur periodically over time. If a trigger event is not detected, the alarm monitor 307 may continue to monitor alarm activity as in step 402. In step 406, if a trigger event is detected, the alarm monitor 307 may activate the wireless signal receiver 308 and cause the wireless signal receiver 308 to scan for wireless signals. The wireless signal receiver 308 may remain in a dormant state until activated by the alarm monitor.

In step 408, the alarm monitor 307 may receive wireless device information from the wireless signal receiver 308 indicating information relating to one or more wireless signals detected within range of the wireless signal receiver 308. The wireless device information may include data regarding the devices that sent the wireless signals, such as, for example, one or more IMEI numbers, one or more MAC addresses, one or more Bluetooth IDs, and/or other device identification information. The wireless device information may also include other information regarding the signal such as the time the signal was detected, the location at which the signal was detected and/or any other information regarding the wireless signal determined by the wireless signal receiver 308. As part of step 408, and/or as a separate step, and based on the IMEI, MAC address, Bluetooth ID, and/or other identification information, additional information may be looked up (e.g., via an online database) and/or otherwise obtained for the wireless devices that sent the received wireless signals.

In step 410, the alarm monitor 307 may determine if the wireless device information received in step 408 is associated with a wireless device that is recognized. For example, the alarm monitor may compare the wireless device information with wireless device information for a list of recognized devices. That list may indicate, for example, devices associated with members of a household residing at the premises 301. Also or alternatively, that list may indicate devices associated with another type of user associated with the premises 301 (e.g., an employee of a business at the premises 301). If the wireless device information received in step 408 is associated with a wireless device that is recognized, the method 400 may end. If the wireless device information received in step 408 is not associated with a wireless device that is recognized, step 412 may be performed. Alternatively, step 410 may be omitted so that step 412 may be performed whether the wireless device information received in step 408 is or is not associated with a wireless device that is recognized.

The alarm monitor 307, in step 412, may store the wireless device information locally or at another local or non-local computing device. As part of step 412, the alarm monitor 307 may store an association of the event, the one or more identifiers, and/or the one or more wireless devices, as described above. In step 414, the alarm monitor may deactivate the wireless signal receiver 308 and return the wireless signal receiver 308 to its dormant state.

In step 416, the alarm monitor 307 may perform one or more additional actions based on the association of the event, the one or more identifiers, and/or the one or more wireless devices. The alarm monitor 307 may, for example, send one or more communications to a user device and/or cause that user device to output the association of the event, the one or more identifiers, and/or the one or more wireless devices (and/or some information based on that association). That user device may, for example, comprise a smart phone, tablet, and/or other computing device associated with a particular user and/or with the premises. The user may, for example, be an owner of the premises 301 and/or a person having administrative and/or other privileges associated with the alarm monitor 307. The user device may, for example, have previously been registered and/or otherwise indicated by the user as a device to which one or more types of communications (e.g., related to the alarm monitor 307 and/or the premises 301) should be sent. The message sent to the user device, and/or the association output by that user device, may comprise one or more of a description of the event (e.g., event type, time, information that caused detection of the event, and/or other event description), the one or more identifier(s), information about wireless device(s) associated with the one or more identifiers, one or more images (and/or live stream of video) from the camera 305, one or more sound clips (and/or live stream of audio) from the microphone 309, and/or other information. The message sent to the user device, and/or the association output by that user device, may also or alternatively comprise one or more options and/or other actions that the user may select and/or cause. Such options and/or action may comprise, for example, sending a message about the event to an emergency responder (e.g., police, a fire department, and/or another governmental authority), to an operator of a network (e.g., an operator of the network 300), to a monitoring service (e.g., to a private security company and/or other entity), to one or more individuals (e.g., one or more other members of a household associated with the premises 301), and/or to another person and/or device. Such options and/or action may comprise, for example, activation of the lighting device(s) 312 and/or of the alert device(s) 313, deactivation of one or more devices in the premises 301, etc. Alternatively, step 416 may be omitted so that no further actions are taken after step 414 regarding the trigger event detected in step 404.

FIG. 5 is a flow chart showing an example method 500 performed by the wireless signal receiver 308 for detecting wireless device data following an indication of a trigger event. The wireless signal receiver 308 may remain in a dormant state until activated by the alarm monitor 307. In step 502, following activation of the wireless signal receiver 308, the wireless signal receiver 308 may be listening for wireless signals (e.g., wireless communications) within range of the wireless signal receiver 308. The wireless signals may be sent from devices that may be inside or outside the premises 301.

In step 504, the wireless signal receiver 308 may detect via a local network one or more wireless signals from wireless device(s) 304a-b such as a WiFi probe request sent by a wireless device seeking a WiFi hotspot, a Bluetooth signal that may have been sent in response to a Bluetooth beacon, LTE signal and/or other wireless signal. In step 506, if the wireless signal receiver 308 has received data indicating non-detection of a wireless signal for a threshold period of time, the wireless signal receiver 308 may send information that no wireless signals were detected to the alarm monitor as discussed in more detail below regarding step 514. If not, the wireless signal receiver 308 may continue to scan for wireless device signals as in step 502.

If a wireless signal is detected, the wireless signal detector 308 may, in step 508, determine data from the wireless signal regarding the wireless device(s) 304a-b that sent the detected wireless signal. The data may comprise information about the wireless device, such as an IMEI number, MAC address, IP address, Bluetooth ID, and/or other information related to the identity of the wireless device(s) that sent the wireless signal(s).

In step 510, the wireless signal receiver 308 may store the determined data to a local database or send the data to a computing device associated with the premises. The wireless signal receiver 308 may also store other information regarding the detected wireless signal including, for example, an association of the event such as the time the signal was detected and/or the location at which the signal was detected. In step 512, the wireless signal receiver 308 may send a response to the wireless device(s) 304a-b denying network access to a network associated with the scanning performed in step 502. Also or alternatively, the wireless signal receiver 308 may refuse a request from the wireless device(s) 304a-b to connect to the network associated with the scanning performed in step 502. The wireless signal receiver 308 may refuse a connection request by, for example, not performing one or more actions associated with creating a connection. In step 514, the wireless signal receiver 308 may send the determined data and/or any other information regarding the detected wireless signal to the alarm monitor 307 via the local network. In the event no wireless signals are detected within the predetermined time period, the wireless signal receiver 308 may send information, in step 514, that no wireless signals were detected. The wireless signal receiver 308 may be configured to clear the local database after sending the data to the alarm monitor 307. In step 516, the wireless signal receiver 308 may discontinue scanning and return to a dormant state.

FIG. 6 is a flow chart showing an example method 600 performed by the wireless signal receiver 308 for detecting wireless device data following an indication of a trigger event. The wireless signal receiver 308 may remain in a dormant state until activated by the alarm monitor 307. In step 602, the wireless signal receiver 308 may receive a trigger event indication from the alarm monitor 307, activating the wireless signal receiver from its dormant state. In step 604, the wireless signal receiver 308 may transmit one or more wireless communications indicating a wireless network, for example, by broadcasting a beacon frame with the network SSID or other identifier associated with the wireless signal receiver 308. Following the transmission by the wireless signal receiver 308, the wireless signal receiver 308 may listen (e.g., scan) for wireless signals within range of the wireless signal receiver 308, in proximity to the premises 301.

In step 606, the wireless signal receiver 308 may receive one or more wireless signals (e.g., wireless communications) from wireless device(s) 304a-b such as a WiFi probe request sent by a wireless device seeking a WiFi hotspot, a Bluetooth signal that may have been sent in response to a Bluetooth beacon, and/or other wireless signal. If the wireless signal is a probe request, the wireless signal receiver 308 may send a probe response to the wireless device according to standard communication protocols. If other types of wireless signals are received, such as a request to authenticate to the network, the wireless signal detector 308 may, in step 608, determine data from the wireless signal regarding the wireless device(s) 304a-b that sent the detected wireless signal without establishing a communication link between the wireless signal receiver 308 and the wireless device that sent the wireless signal. The wireless signal receiver 308 may send a message denying network access to the wireless device(s) that sent the signal(s). The determined data may comprise information about the wireless device, such as an IMEI number, MAC address, IP address, Bluetooth ID, and/or other information related to the identity of the wireless device(s) that sent the wireless signal(s). The wireless signal receiver 308 may also store other information regarding the detected wireless signal(s) including, for example, an association of the event such as the time each of the signal(s) were detected and/or the location at which each of the signal(s) were detected.

In step 610, the wireless signal receiver 308 may send the determined data and/or other data to a computing device, such as the alarm monitor 307 or other network computing device, via a local network for storage. In step 612, the wireless signal receiver may discontinue broadcasting the wireless network and return to a dormant state without establishing a connection with the wireless device(s) that sent the wireless signal(s). In some cases, the alarm monitor 307 may send a signal to the wireless signal receiver 308 to instruct the wireless signal receiver 308 to discontinuing scanning for wireless signals.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving, by a computing device, an indication of a potential unauthorized entry associated with a premises;
   in response to the indication of the potential unauthorized entry, initiating sending one or more messages comprising information associated with a simulated wireless network;
   determining, based on one or more responses to the one or more messages, one or more identifiers associated with one or more wireless devices in proximity to the premises; and
   after storing an association of the potential unauthorized entry and the one or more identifiers, terminating the sending the one or more messages comprising information associated with the simulated wireless network.

2. The method of claim 1, further comprising causing an action based on the one or more wireless devices.

3. The method of claim 2, wherein the causing the action comprises causing one or more of:
   performing an action associated with denial of connection to a network associated with the premises;
   sending, to the one or more wireless devices, one or more indications of a denial of connection to the simulated wireless network;
   refusing a request, from the one or more wireless devices, for a connection to the simulated wireless network;
   determining, before the storing, whether the one or more wireless devices are associated with one or more of: a user associated with the premises or a list of recognized devices; or
   causing output, to a device associated with the premises, of one or more of the following: the association of the potential unauthorized entry and the one or more identifiers, one or more images captured by a camera located at the premises, or a time associated with the potential unauthorized entry.

4. The method of claim 1, further comprising:
based on the association of the potential unauthorized entry and the one or more identifiers, sending a message to a second computing device associated with one or more of: an emergency responder, a network operator, a monitoring service, or a person designated by a user associated with the premises.

5. The method of claim 1, further comprising:
based on the association of the potential unauthorized entry and the one or more identifiers, causing activation of one or more of:
an audible alert device located at the premises, or
lighting located at the premises.

6. The method of claim 1, wherein the storing the association comprises storing the one or more identifiers associated with the one or more wireless devices detected in proximity to the premises and a time associated with the potential unauthorized entry.

7. The method of claim 1, wherein the determining the one or more identifiers comprises performing a scan in response to receiving the indication of the potential unauthorized entry.

8. An apparatus comprising:
one or more processors; and
memory storing instructions, that when executed by the one or more processors, cause the apparatus to:
receive an indication of a potential unauthorized entry associated with a premises;
in response to the indication of the potential unauthorized entry, initiate sending one or more messages comprising information associated with a simulated wireless network;
determine, based on one or more responses to the one or more messages, one or more identifiers associated with one or more wireless devices in proximity to the premises; and
after storing an association of the potential unauthorized entry and the one or more identifiers, terminate the sending the one or more messages comprising information associated with the simulated wireless network.

9. The apparatus of claim 8, wherein the instructions, when executed by the one or more processors, further cause the apparatus to:
cause an action based on the one or more wireless devices.

10. The apparatus of claim 9, wherein the instructions, when executed by the one or more processors, cause the apparatus to: cause the action by causing one or more of:
performing an action associated with denial of connection to a network associated with the premises;
sending, to the one or more wireless devices, one or more indications of a denial of connection to the simulated wireless network;
refusing a request, from the one or more wireless devices, for a connection to the simulated wireless network;
determining, before the storing, whether the one or more wireless devices are associated with one or more of: a user associated with the premises or a list of recognized devices; or
causing output, to a device associated with the premises, of one or more of the following: the association of the potential unauthorized entry and the one or more identifiers, one or more images captured by a camera located at the premises, or a time associated with the potential unauthorized entry.

11. The apparatus of claim 8, wherein the instructions, when executed by the one or more processors, further cause the apparatus to:
based on the association of the potential unauthorized entry and the one or more identifiers, send a message to a second computing device associated with one or more of: an emergency responder, a network operator, a monitoring service, or a person designated by a user associated with the premises.

12. The apparatus of claim 8, wherein the instructions, when executed by the one or more processors, further cause the apparatus to:
based on the association of the potential unauthorized entry and the one or more identifiers, cause activation of one or more of:
an audible alert device located at the premises, or
lighting located at the premises.

13. The apparatus of claim 8, wherein the instructions, when executed by the one or more processors, cause the apparatus to store the association by storing the one or more identifiers associated with the one or more wireless devices detected in proximity to the premises and a time associated with the potential unauthorized entry.

14. The apparatus of claim 8, wherein the instructions, when executed by the one or more processors, cause the apparatus to determine the one or more identifiers by performing a scan in response to receiving the indication of the potential unauthorized entry.

15. A method comprising:
initiating sending, by a computing device and based on an indication of a potential unauthorized entry associated with a premises, one or more messages comprising information associated with a simulated wireless network;
determining, from one or more detected wireless communications responsive to the one or more messages, one or more identifiers associated with one or more wireless devices; and
after storing an association of the potential unauthorized entry and the one or more identifiers, terminating the sending the one or more messages comprising information associated with the simulated wireless network.

16. The method of claim 15, further comprising: causing one or more of:
performing an action associated with denial of connection to a network associated with the premises;
sending, to the one or more wireless devices, one or more indications of a denial of connection to the simulated wireless network;
refusing a request, from the one or more wireless devices, for a connection to the simulated wireless network;
determining, before the storing, whether the one or more wireless devices are associated with one or more of: a user associated with the premises or a list of recognized devices; or
causing output, to a device associated with the premises, of one or more of the following: the association of the potential unauthorized entry and the one or more identifiers, one or more images captured by a camera located at the premises, or a time associated with the potential unauthorized entry.

17. The method of claim 15, wherein the one or more identifiers comprise one or more of a media access control (MAC) address or an international mobile equipment identity (IMEI) number.

18. The method of claim 15, further comprising receiving the indication of the potential unauthorized entry, and wherein the determining the one or more identifiers comprises performing a scan in response to receiving the indication.

19. The method of claim 15, further comprising receiving the indication, wherein the indication comprises one or more of:
 a detection of an intruder in the premises;
 a trigger of a security system associated with the premises;
 an activation of a sensor associated with the premises;
 an opening of a door associated with the premises;
 an opening of a window associated with the premises;
 an activation of lighting associated with the premises;
 a detection of movement in a video stream from a camera associated with the premises; or
 a detection of one or more sounds in the premises.

20. The method of claim 15, further comprising:
 based on the association of the potential unauthorized entry and the one or more identifiers, sending a message to a second computing device associated with one or more of: an emergency responder, a network operator, a monitoring service, or a person designated by a user associated with the premises.

21. The method of claim 15, further comprising:
 based on the association of the potential unauthorized entry and the one or more identifiers, causing activation of one or more of:
  an audible alert device located at the premises, or
  lighting located at the premises.

22. The method of claim 15, wherein the storing the association comprises storing the one or more identifiers associated with the one or more wireless devices and a time associated with the potential unauthorized entry.

23. An apparatus comprising:
 one or more processors; and
 memory storing instructions, that when executed by the one or more processors, cause the apparatus to:
  initiate sending, based on an indication of a potential unauthorized entry associated with a premises, one or more messages comprising information associated with a simulated wireless network;
  determine, from one or more detected wireless communications responsive to the one or more messages, one or more identifiers associated with one or more wireless devices; and
  after storing an association of the potential unauthorized entry and the one or more identifiers, terminate the sending the one or more messages comprising information associated with the simulated wireless network.

24. The apparatus of claim 23, wherein the instructions, when executed by the one or more processors, further cause the apparatus to:
 cause one or more of:
  performing an action associated with denial of connection to a network associated with the premises;
  sending, to the one or more wireless devices, one or more indications of a denial of connection to the simulated wireless network;
  refusing a request, from the one or more wireless devices, for a connection to the simulated wireless network;
  determining, before the storing, whether the one or more wireless devices are associated with one or more of: a user associated with the premises or a list of recognized devices; or
  causing output, to a device associated with the premises, of one or more of the following: the association of the potential unauthorized entry and the one or more identifiers, one or more images captured by a camera located at the premises, or a time associated with the potential unauthorized entry.

25. The apparatus of claim 23, wherein the one or more identifiers comprise one or more of a media access control (MAC) address or an international mobile equipment identity (IMEI) number.

26. The apparatus of claim 23, wherein the instructions, when executed by the one or more processors, further cause the apparatus to:
 receive the indication of the potential unauthorized entry, and wherein the instructions, when executed, cause the apparatus to determine the one or more identifiers by performing a scan in response to receiving the indication.

27. The apparatus of claim 23, wherein the instructions, when executed by the one or more processors, further cause the apparatus to:
 receive the indication, wherein the indication comprises one or more of:
  a detection of an intruder in the premises;
  a trigger of a security system associated with the premises;
  an activation of a sensor associated with the premises;
  an opening of a door associated with the premises;
  an opening of a window associated with the premises;
  an activation of lighting associated with the premises;
  a detection of movement in a video stream from a camera associated with the premises; or
  a detection of one or more sounds in the premises.

28. The apparatus of claim 23, wherein the instructions, when executed by the one or more processors, further cause the apparatus to:
 based on the association of the potential unauthorized entry and the one or more identifiers, send a message to a second computing device associated with one or more of: an emergency responder, a network operator, a monitoring service, or a person designated by a user associated with the premises.

29. The apparatus of claim 23, wherein the instructions, when executed by the one or more processors, further cause the apparatus to:
 based on the association of the potential unauthorized entry and the one or more identifiers, cause activation of one or more of:
  an audible alert device located at the premises, or
  lighting located at the premises.

30. The apparatus of claim 23, wherein the instructions, when executed, cause the apparatus to store the association by storing the one or more identifiers associated with the one or more wireless devices and a time associated with the potential unauthorized entry.

* * * * *